United States Patent [19]

Higuchi

[11] Patent Number: 5,345,436
[45] Date of Patent: Sep. 6, 1994

[54] RECORDING MEDIUM OF FLAT SURFACE WITH RESIN FILLED RING GROVE

[75] Inventor: Yuichi Higuchi, Yokohama, Japan

[73] Assignee: Victor Company of Japan, Ltd., Kanagawa, Japan

[21] Appl. No.: 8,535

[22] Filed: Jan. 25, 1993

[30] Foreign Application Priority Data

Jan. 28, 1992 [JP] Japan .................................. 37217

[51] Int. Cl.$^5$ ........................... G11B 7/26; G11B 11/16
[52] U.S. Cl. ..................................... 369/282; 369/283;
369/280; 428/694 R
[58] Field of Search ..................... 369/280, 282, 275.1,
369/279, 283; 428/634, 900

[56] References Cited

U.S. PATENT DOCUMENTS

| | | | |
|---|---|---|---|
| 4,747,093 | 5/1988 | Benne et al. | 369/280 |
| 4,941,066 | 7/1990 | Swinburne et al. | 369/282 |
| 5,089,358 | 2/1992 | Taki et al. | 369/275.1 |
| 5,217,850 | 6/1993 | Fujii et al. | 369/282 |

FOREIGN PATENT DOCUMENTS 46-21312 6/1971 Japan .
3-16043 1/1991 Japan .

*Primary Examiner*—Paul M. Dzierzynski
*Assistant Examiner*—Kim-Kwok Chu
*Attorney, Agent, or Firm*—Michael N. Meller

[57] ABSTRACT

The present invention discloses a disc having an information signal surface on which a replica of information signals is formed by a stamper provided in a metal mold, and a manufacturing method of the disc. The disc includes a disc substrate having a generally flat surface on which the replica of the information signal is formed, a center through hole formed at a center thereof and a ring groove inevitably formed as an inverted replica by a shape of a collar of a retainer which is provided in the metal mold to support the stamper. The ring groove concentrically divides the generally flat surface into inner and outer surfaces. A reflecting layer is provided on the generally flat surface for reflecting reading light from a reproducing apparatus. Further, a protecting layer is provided on the reflecting layer for protecting the reflecting layer. Resin is filled in the ring groove for causing the inner and the outer flat surface to be bridged and flush each other for printing a label at a desired area of the inner and the outer surfaces without being interrupted by the ring groove.

8 Claims, 4 Drawing Sheets

RECORDING MEDIUM OF FLAT SURFACE WITH RESIN FILLED RING GROVE

BACKGROUND OF THE INVENTION

1. Field of the Invention

The present invention relates to improvements of a disc and the manufacturing method of the disc, and it particularly relates to a disc which allows to be printed with a good quality label on its flat surface.

2. Description of the Related Art

Recently, a disc (optical disc) such as a CD (compact disc) or a CD-ROM (Read Only Memory) is popular among users and is widely used as recorded sound information or picture information because it is capable of recording a large amount of information and performing quick random access by using an optical pick-up.

FIG. 1 is a partially cutout view in perspective of a disc of a prior art.

Referring to FIG. 1, a disc 1B of the prior art generally comprises a disc substrate 2 made of transparent disc molding resin material such as polycarbonate or acrylic resin, a reflecting layer 3 made of aluminum formed on an information signal surface 2c of the disc substrate 2 by a sputtering or a vapor deposition method, and a protecting layer 4 of several $\mu$m made of ultraviolet rays curing resin formed on the reflecting layer 3 by a spin coat method.

Further, the disc 1B is provided with a center through hole 5 at the center thereof for being mounted on a reproducing apparatus (not shown), and a ring groove 4b (2b 3b) concentrically formed with the center through hole 5 on the same surface of the information signal surface 2c. A numeral 2b designates a ring groove directly formed on the disc substrate which corresponds to the ring groove 4b, which is inevitably formed on a disc molding process as described hereafter. The ring groove 2b has an inside diameter of 35 mm, a width of 1.0 mm and a depth of 0.4 mm. A numeral 3b indicates a portion of the ring groove 2b covered with the reflecting layer 3, and 4b a portion of the ring groove 2b covered with the protecting layer 4 over the reflecting layer 3. Therefore, a top surface of the protecting layer 4 is exposed to the atmosphere and divided into two areas by the ring groove 4b, an inner flat area 4a which is used for clamping the disc 1B to a disc playing device, and an outer flat area 4c corresponding to the upper side of the information signal surface 2c. On the outer flat area 4c, a label 6B, a design and information of which are often related to the information signals to be recorded, is printed by a screen printing machine or an offset lithography machine (not shown).

As well known, the information signals are reproduced by irradiating a laser beam from an optical pick-up of the reproducing apparatus on the information surface 3c through an opposite surface 2e of the flat area 4c, wherein the numeral 3c indicates a part of the information signal surface 2c covered with the reflecting layer 3.

Next, the description is given to the manufacturing method of the disc 1B of the prior art and the reason why the ring groove 2b is inevitably formed on the disc substrate 2 on the disc molding process referring to FIG. 2.

FIG. 2 is a sectional view showing a disc metal mold for molding a disc substrate in a prior art.

Generally, the disc 1B is produced as a mass production process using a disc metal mold 10 having a fixed part and a movable part which is moved closer to the fixed part to form a cavity 22 for molding the disc substrate 2 as described hereafter referring to FIG. 2.

Referring to FIG. 2, 11 designates a fixed platform 11 of the fixed part for attaching a fixed core 13, 12 a spool bushing having a inlet 12a provided at the center of the fixed platform 11 for introducing disc mold resin into a cavity 22, a stamper 14 having an information signal surface 14c on which series of pits concentrically formed for forming inverted replicas of the pits on the disc 1B correspondingly with the information signals, and having a center hole 14b at a center thereof, 15 a retainer having a collar 15a protruding downward for supporting the stamper 14 at a center thereof, and 16 a flange having a collar 16a for supporting the stamper 14 at a periphery thereof. The stamper 14 is attached on the fixed core 13 provided on the fixed platform 11 by causing an outer peripheral portion and an inner peripheral portion of the center hole 14b thereof to engage with the collar 16a of the flange 16 and the collar 15a of the retainer 15, respectively.

On the other hand, a punch 18 for punching the center through hole 5 in the disc 1B is snug-fitted and is slidable in directions of arrows A1, A2 in a movable platform 17 of the movable part, and a top end of the punch 18 opposes a bottom of the spool bushing 12. A movable core 19 is also attached on the movable platform 17 by causing an outer peripheral part and an inner peripheral part thereof respectively to engage with an outer peripheral retainer 21 and an inner peripheral retainer 20 through which a part of the punch 18 is protruding into a cavity 22. Further, both top surfaces of the movable core 19 and the inner peripheral retainer 20 are polished to be kept flush each other, and the upper surface of the outer peripheral retainer 21 is made higher than both the top surfaces of the movable core 19 and the inner peripheral retainer 20 and contacts with a bottom of the collar 16a of the flange 16. It should be noted that the outer and inner peripheral retainers 21, 20 are provided in a detachable manner on the movable platform 17 so as to enable the top surface of the movable core 19 to be polished.

Accordingly, a space formed between the movable core 19 and the stamper 14 becomes the cavity 22 for molding the disc substrate 2. The disc substrate 2 is molded by injecting disc mold resin material from the inlet 12a into the cavity 22. At that time, each shape of the distal end surface of the spool bush 12, the protruding part of the collar 15a and the information signal surface 14c is respectively transferred as a replica on the disc substrate 2, i.e., the inner flat surface 2a, the ring groove 2b and the information signal surface 2c having the series of pits corresponding to the information signals as shown in FIG. 1. Then, the punch 18 is pushed in the direction of the arrow A1 in the disc metal mold 10 to make the center through hole 5, thus, the disc substrate 2 is molded.

After the disc substrate 2 taken out from the disc metal mold 10 is provided with the reflecting layer 3 on the information signal surface 2c, the inner flat surface 2a and the ring groove 2b, the protecting layer 4 is coated on the entire reflecting layer 3 and then the label 6B is printed on the outer flat area 4c to obtain the disc 1B.

As shown in FIG. 1, each of the inner flat surface 2a, the ring groove 2b and the information signal surface 2c covered by the reflecting layer 3 is respectively shown as a numeral 3a, 3b and 3c, and the same part on which the protecting layer 4 is formed is corresponding to the inner flat area 4a, the ring groove 4b and the outer flat area 4c.

As clearly understood from the above description, the ring groove 2b(3b,4b) is inevitably formed on the disc substrate 2 which divides a generally flat surface of the disc substrate 2 into two parts, i.e., the inner flat surface 2a and the information signal surface 2c as long as employing such a disc manufacturing method as attaching the stamper 14 by causing the inner periphery of the center hole 14b thereof to engage with the collar 15a of the retainer 15 and making the passing center hole 5 of the disc 1B in the disc metal mold 10.

In the disc 1B of the prior art as shown in FIG. 1, the label 6B is usually printed only on the outer flat surface 4c, however, there is a demand for printing the label 6B on the entire surface of the disc leaving the center through hole 5, which poses a problem that the ring groove 4b prevents from being printed with a label in good appearance because the ring groove 4b interrupts a part of the label 6b.

In another prior art, there is such a disc manufacturing method as follows:

A disc substrate is molded so as to have thoroughly a flat surface over the whole information signal surface by using a disc metal mold in which no center through hole forming device is provided. After the molded disc is taken out from the disc metal mold, a center through hole is punched out in the disc substrate at a center thereof by a mechanical method.

According to the above method, as the whole top surface of the molded disc except the center through hole is flat, the label is printable on the whole top surface of which the reflecting layer and a protecting layer is formed, however, it requires such a difficult process as manually positioning precisely the center through hole under a microscope upon punching thereof, which poses a problem i.e. it makes the mass production of such discs impractical due to an increase of manpower.

Therefore, there is a demand to provide a disc and a manufacturing method of the disc for satisfying both conditions, i.e., one is to enable mass production of the discs by using the disc metal mold with which the passing center hole is casted together as shown in FIG. 1 and another is to enable printing the label on the entire top surface leaving the center through hole on the disc.

SUMMARY OF THE INVENTION

Accordingly, a general object of the present invention is to provide a disc and a manufacturing method of the disc in which the above disadvantages have been eliminated.

A specific object of the present invention is to provide a manufacturing method of a disc including the steps of attaching a stamper having a center hole and an information signal surface to a metal mold by causing an inner peripheral portion of the center hole and the outer peripheral portion of the stamper to engage with a first collar of a first retainer and with a second collar of a second retainer provided in the metal mold respectively, molding a disc substrate having a generally flat surface including a replica corresponding to the information signal surface by the stamper and a groove formed as an inverted replica by a shape of the first collar by injecting transparent resin into the metal mold, and forming a center through hole at a center of the disc substrate by hole forming means provided in the metal mold, the groove dividing concentrically with the center through hole the generally flat surface into inner and outer surfaces, comprising the steps of, forming a generally reflecting layer on the flat surface of the disc substrate, forming a protecting layer on the reflecting layer, filling resin into the groove for causing said inner surface and the outer surface to be bridged and flush each other, and printing a label on the inner and outer surfaces without being interrupted by the groove.

An another specific object of the present invention is to provide a disc having an information signal surface on which an information signal is formed in a form of pits by a stamper provided in a metal mold comprising, a disc substrate having a generally flat surface on which the information signal surface is formed, a center through hole provided at a center thereof and a ring groove formed as an inverted replica of a part of the metal mold, the ring groove dividing concentrically with the center through hole the generally flat surface into inner and outer surfaces, a reflecting layer provided on the generally flat surface, a protecting layer provided on the reflecting layer, resin means filled in the ring groove for causing the inner surface and the outer surface to be bridged and flush each other, a label printed over the protecting layer at a desired area of the inner and outer surfaces and a top surface of the ring groove filled with the resin means.

Other object and further features of the present invention will be apparent from the following detailed description.

DETAILED DESCRIPTION OF THE PREFERRED EMBODIMENT

Figure 1:
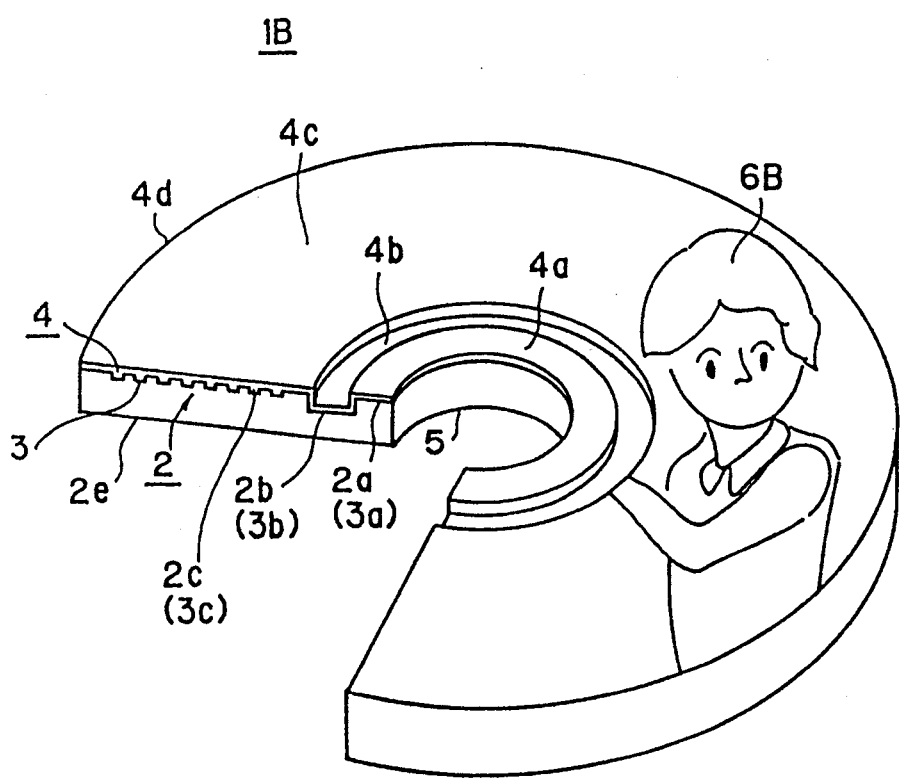
FIG. 1 is a partially cutout view in perspective of a disc of a prior art.
Figure 2:
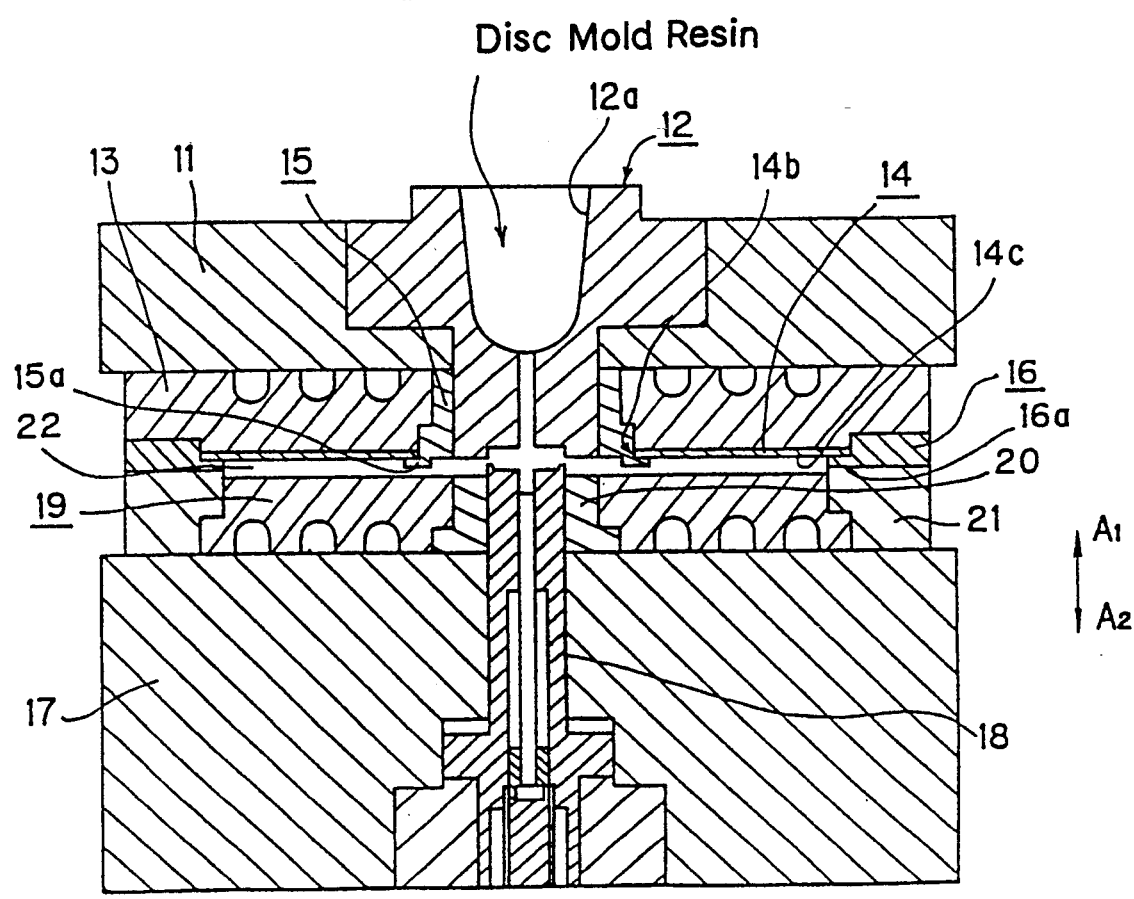
FIG. 2 is a sectional view showing a disc metal mold for molding a disc substrate in the prior art.

Description will be given to an embodiment according to the present invention referring to FIG. 3 and FIG. 4, wherein the like reference characters as shown in FIG. 1 and FIG. 2 designate like or corresponding parts throughout the drawings, and detailed descriptions of the like parts are omitted for simplicity except for new parts employed.

Figure 3:
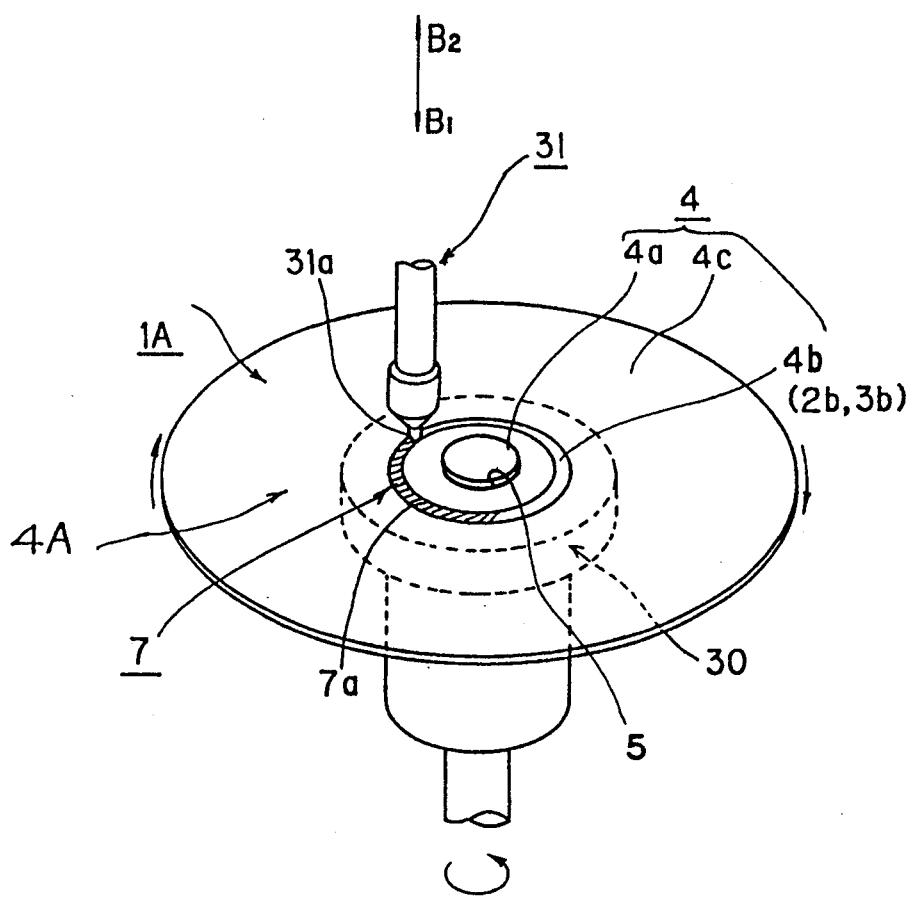
FIG. 3 is a perspective view showing a main process of a manufacturing method of the present invention.

FIG. 3 is a perspective view showing a main process of a manufacturing method of the present invention.

Figure 4:
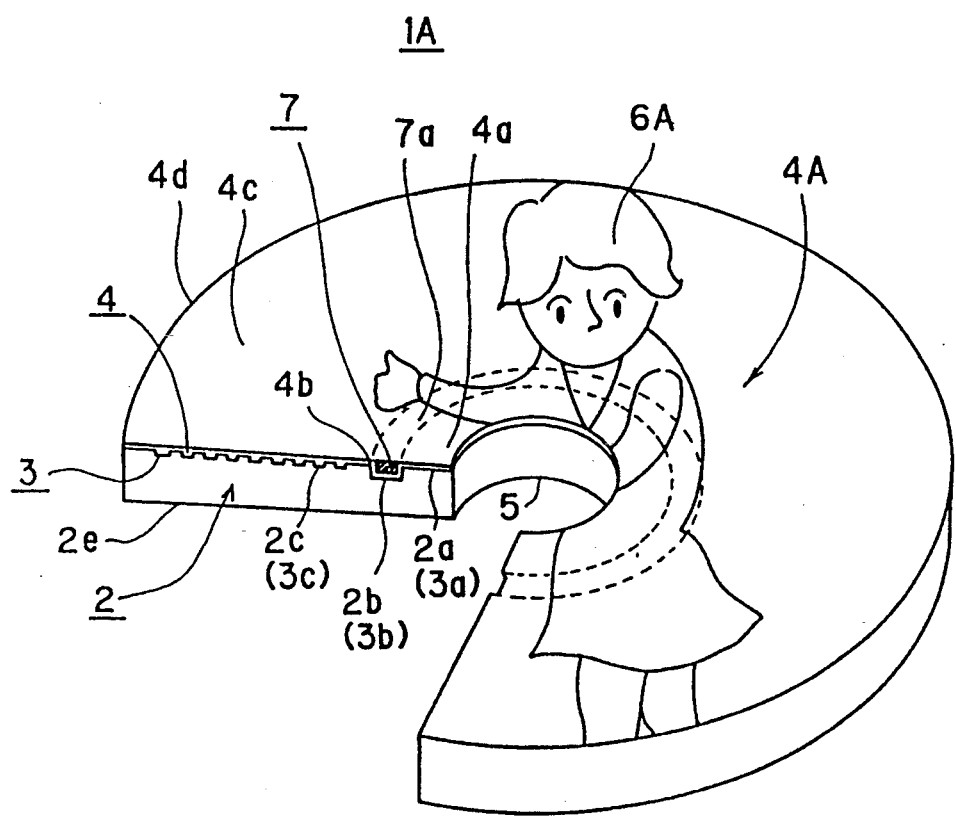
FIG. 4 is a partially cutout view in perspective of a disc of the present invention.

FIG. 4 is a partially cutout view in perspective of a disc of the present invention.

Referring to FIG. 3 and FIG. 4, features of a disc 1A and a manufacturing method according to the present invention are as follows:

(1) After the disc substrate 2 is molded by using the disc metal mold 10 and the center through hole 5 is provided in the disc substrate 2 in the disc metal mold 10 as described in the foregoing, the reflecting layer 3 and the protecting layer 4 are formed on the information signal surface of the disc substrate 2 in this order as mentioned in the foregoing.

(2) The ring groove 2b (4b, 3b) formed in the disc substrate 2 is filled with resin such as ultraviolet rays curing resin.

(3) An area available for label printing is enlarged from the outer flat area 4c of the prior art to a whole area 4A(4a, 7a, 4c,).

(4) The label 6A is printed on a desired part of the whole area 4A (4a, 7a, 4c), where numeral 7a indicates a top flat surface of the ring groove 4b filled with the resin.

Next a detailed description is given to a manufacturing method of the disc 1A according to the present invention referring to FIGS. 2 through 4.

Process 1

The stamper 14 having the information surface 14c is attached to the disc metal mold 10 by causing the outer peripheral portion thereof and the inner peripheral portion of the center hole 14b thereof to engage with the collar 16a of the flange 16 and the collar 15a of the retainer 15 respectively, then, the disc substrate 2 is molded by injecting transparent resin into the above disc metal mold 10.

In this Process 1, each shape of the distal end surface of the spool bushing 12, the protruding part of the collar 15a and the information signal surface 14c is respectively transferred as a replica on the disc substrate 2 i.e., the inner flat surface 2a, the ring groove 2b and the information signal surface 2c on the surface of the disc substrate 2 as mentioned in the foregoing. The ring groove 2b formed correspondingly with the shape of the collar 15a of the retainer 15 has an inner diameter of 35 mm, a width of 1.0 mm and a depth 0.4 mm, approximately. The information signal surface 14c has about the same level as the inner flat surface 2a. The upper surface of the movable core 19 is transferred to the opposite surface 2e of the disc substrate 2. The center through hole 5 is formed by the punch 18 in the disc metal mold 10 at the molding process.

Process 2

After the disc substrate g is taken out from the disc metal mold 10, the reflecting layer 3 of such as aluminum is formed on the inner flat surface 2a, the ring groove 2b and the information signal surface 2c.

Process 3

The protecting layer 4 is formed over the reflecting layer 3.

The above processes 1 through 3 are the same as those of the prior art as mentioned in the foregoing. Therefore, respective parts of the inner flat surface 2a, the ring groove 2b and the information signal surface 2c on which the reflecting layer 3 is formed are designated as numeral 3a, 3b and 3c, and the same parts on which the protecting layer 4 is formed correspond to the inner flat area 4a, the ring groove 4b and the outer flat area 4c.

Process 4

Referring to FIG. 3, after the above process 3, resin 7 such as ultraviolet rays curing resin is filled in the ring groove 4b, which is a main part of the present invention and is an additional new process to those of the prior art.

After the disc substrate 2 is placed on a rotary table 30, the disc substrate 2 is rotated in a direction of an arrow together with the rotary table 30, and the resin 7 is filled into the ring groove 4b from an injection orifice 31a of a dispenser 31 by causing the dispenser 31 to descend in a direction of an arrow B1 close to the ring groove 4b. At that time, injection amount of the resin 7 is controlled so that the top flat surface 7a of the resin 7 becomes about the same level as those of the inner flat area 4a and the outer flat area 4c, so that the inner flat area 4a, the top flat surface 7a and the outer flat area 4c are bridged each other without interruption and become substantially flush each other to form a continuous surface of the whole area 4A (4a, 7a, 4c) except the center through hole 5 according to the present invention, which is adequately larger than the outer flat area 4c of the disc 1B of the prior art, and is available for printing a larger label 6A than the label 6B of the prior art.

Process 5

After the disc 1A is taken out from the rotary table 30, the label 6A is printed at a desired area of the whole area 4A of the disc 1A by using a screen printing machine or an offset printing machine.

The label 6A printed across the ring groove 4b into the inner flat area 4a has a good appearance because of no ring groove interrupting the label design.

In the above embodiment, the resin 7 is filled in the ring groove 4b after the reflecting layer 3 and protecting layer 4 have been formed on the disc substrate 2 in order to protect the information signal surface 2c of the recording disc 1A from getting a damage.

It should be noted, however, that the resin 7 can be filled into the ring groove 3b or 2b before the protecting layer 4 or the reflecting layer 3 is formed. The order of each processes 2 through 4 mentioned in the foregoing may be changed in the present invention.

Further, it should be noted that the disc 1A of the present invention is applicable to not only well-known compact discs (CD) or CD-ROM discs having a diameter about 12 cm but also such a disc-type recording medium as having a groove inevitably formed on an upper surface thereof, on which a label is to be printed, by a downwardly protruding collar of a retainer provided in a metal mold for retaining a stamper therein, in which disc the groove is filled with resin to enlarge the upper surface area as mentioned in the foregoing.

What is claimed is:

1. A manufacturing method of a disc including the steps of attaching a stamper having a center hole and an information signal surface to a metal mold by causing an inner peripheral portion of the center hole and the outer peripheral portion of the stamper to engage with a first collar of a first retainer and with a second collar of a second retainer provided in the metal mold respectively, molding a disc substrate having a generally flat surface including a replica corresponding to the information signal surface by the stamper and a groove formed as an inverted replica by a shape of the first collar by injecting transparent resin into the metal mold, and forming a center through hole at a center of the disc substrate by hole forming means provided in the metal mold, said groove dividing concentrically with said center through hole the generally flat surface of said disk substrate into inner and outer surfaces comprising the steps of:

forming a protecting layer on the reflecting layer;
filling resin into the groove in such a manner that a top flat surface of the resin becomes approximately the same level as that of the inner and outer surfaces for causing said inner and outer surfaces to be bridged and flush with one another; and
printing each label on the inner and outer surfaces without being interrupted by the groove.

2. A manufacturing method of a disc as claimed in claim 1, wherein the step of filling resin is performed before the steps of forming the reflecting layer and the protecting layer.

3. A manufacturing method of a disc as claimed in claim 1, wherein the step of filling resin is performed after the steps of forming the reflecting layer and the protecting layer.

4. A manufacturing method of a disc as claimed in claim 1, wherein the step of filling resin is performed after the step of forming the reflecting layer.

5. A disc having an information signal surface on which an information signal is formed in form of pits by a stamper provided in a metal mold comprising:
   a disc substrate having a generally flat surface on which the information signal surface is formed, a center through hole provided at a center thereof and a ring groove formed as an inverted replica of a part of said metal mold, the ring groove dividing concentrically with said center through hole the generally flat surface of said disk substrate into inner and outer surfaces;
   a reflecting layer provided on the generally flat surface;
   a protecting layer provided on the reflecting layer;
   resin means filled in the ring groove in such a manner that a top flat surface of the resin becomes approximately the same level as that of the inner and outer surfaces for causing the inner and outer surfaces to be bridged and flush with one another; and
   a label printed over the protecting layer at a desired area of the inner and outer surfaces and a top surface of said ring groove filled with said resin means.

6. A disc as claimed in claim 1, wherein the resin means is directly filled in the ring groove of the disc substrate.

7. A disc as claimed in claim 1, wherein the resin means is filled in the ring groove which is preliminary provided with the reflecting layer.

8. A disc as claimed in claim 1, wherein the resin means is filled in the ring groove which is preliminary provided with the protecting layer.

* * * * *